Patented Nov. 8, 1927.

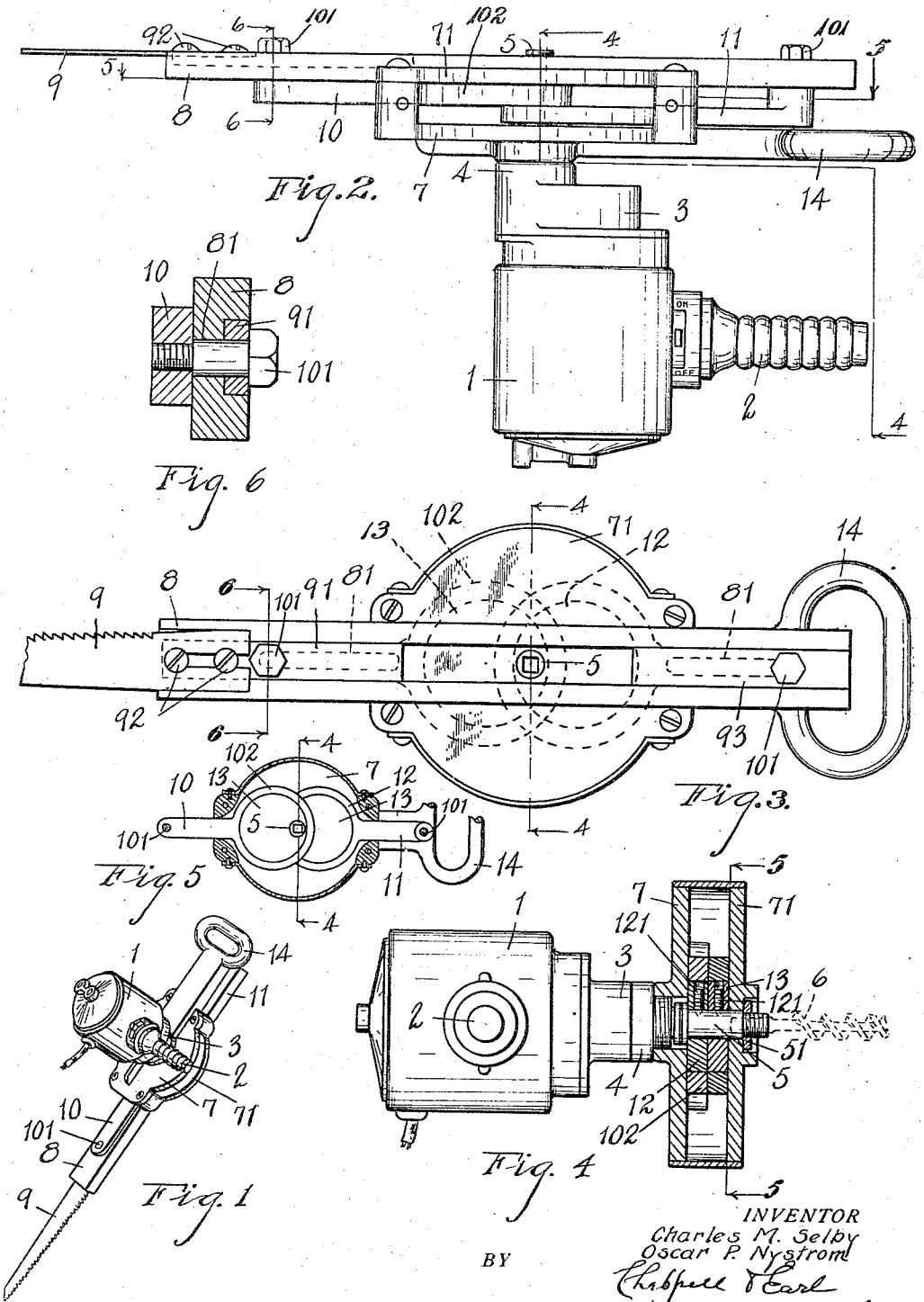

1,648,008

UNITED STATES PATENT OFFICE.

CHARLES M. SELBY AND OSCAR P. NYSTROM, OF HOLLAND, MICHIGAN, ASSIGNORS TO HOLLAND FURNACE COMPANY, OF HOLLAND, MICHIGAN.

POWER-DRIVEN HANDSAW.

Application filed December 1, 1925. Serial No. 72,448.

This invention relates to improved electrically or power driven hand saws.

The object of the invention is to provide a simple and compact structure in which the vibration is minimized, enabling the structure to be used in any relation without especially anchoring the case.

A further object is to provide a simple device which is usable with an ordinary electric drill motor.

Objects pertaining to details of construction and operation will appear from the detailed description to follow. The invention is defined and pointed out in the claims.

A structure embodying the features of our invention is illustrated in the accompanying drawing, forming a part of this application, in which Fig. 1 is a perspective view of our improved electrically driven hand saw on a small scale.

Fig. 2 is a side elevation of the same, the motor being shifted to a different position.

Fig. 3 is a top plan view of the structure as arranged in Fig. 2, showing the saw slide and guide and counterbalance, the relation to the eccentrics and the pitmen therefor being indicated by dotted lines in extreme positions of reciprocation.

Fig. 4 is a detail transverse sectional view on line 4—4 of Figs. 2, 3 and 5, showing the arrangement of the eccentrics and of the eccentric rings and the method of guiding and maintaining the same in position.

Fig. 5 is a detail view in section taken on line 5—5 of Figs. 2 and 4, with the front face plate 71 removed, showing the position and arrangement and details of construction of the eccentrics and pitmen, portions appearing in dotted lines.

Fig. 6 is an enlarged detail cross sectional view on line 6—6 of Figs. 2 and 3, showing details of the connection of the pitmen to the saw slide.

In the drawings in all the views same parts are identified by the same numerals of reference. 1 is the main motor case, being of the usual construction of such motor for electric hand drills. 2 is the handle therefor. 3 is the gear case and 4 is the bearing hub through which extends the modified spindle 5, with socket for bit 6 and which is here adapted for the special use beyond the boring. It is provided with collar and lock nut 51 for retaining the saw driving means in place. The mechanism comprises a casing with a main face plate 7 and a cover plate 71, suitably spaced to receive the driving eccentrics and connections. Diametrically across the face of the cover plate 71 is the saw guide 8 extended at the opposite side of the face to serve as a guide for the counterbalance slide.

The saw 9, usually of the key-hole type, is slotted and retained in place on the saw slide 91 by screws 92 in a suitable slot. The saw is driven by the pitman 10 connected thereto by a shouldered screw 101 which is journaled through the saw slide 91 and reciprocates in a slot 81 in the bottom of the saw guide. The pitman is driven by eccentric 12, which is secured by a suitable set screw 121 to the shaft 5. An eccentric ring 102 embraces eccentric 12 and connects by pitman 10 and pivot 101 to the saw slide 91.

The counterbalance slide 93 for the saw and slide is similarly disposed in the diametrically opposite position in the saw guide extension and is of the same weight. Exactly opposed to the eccentric 12 is the eccentric 13 to serve as a counterbalance therefor and it is connected by pitman 11 to the counterbalance slide 93 in the same manner that pitman 10 is connected to the saw slide 91.

A loop handle 14 is preferably cast integral with the main plate 7 of the casing.

We have shown our improved power driven hand saw in its improved form. The saw may be operated by any suitable connection in place of the electric motor, although it is especially adapted to the hand electric drill motor. We desire to claim the invention broadly and specifically, as pointed out in the appended claims.

Having thus described our invention, what we claim as new and desire to secure by Letters Patent is:

1. In an electrically power driven hand saw, the combination of a portable motor with projecting driving shaft, a case attached to said shaft with a transverse guide way disposed diametrically across its face, a saw slide with saw in one of said guide ways and a counterbalance slide weight in the opposite end, opposed counterbalanced eccentrics with pitmen connected thereto, one of which is connected to drive the said saw and the other of which is connected to the counterweight slide, coacting as specified.

2. In a power driven hand saw, the combination of driving means with projecting driving shaft, a case attached to said shaft, with a transverse guide way disposed diametrically across its face, a saw slide with saw in one of said guide ways and a counterbalance slide weight in the opposite end, and opposed counterbalanced eccentrics with pitmen connected thereto, one of which is connected to drive the said saw and the other of which is connected to the counterweight slide, coacting as specified.

3. In a power driven hand saw, the combination with driving mechanism of a driving shaft, opposed counterbalanced eccentrics thereon, a saw with extended guide, a saw pitman connection to one of said eccentrics, and a counterweight disposed opposite to said saw with a pitman connection to actuate said counterweight in opposition to said saw, as specified.

In witness whereof we have hereunto set our hands.

CHARLES M. SELBY.
OSCAR P. NYSTROM.